United States Patent Office 3,447,377
Patented June 3, 1969

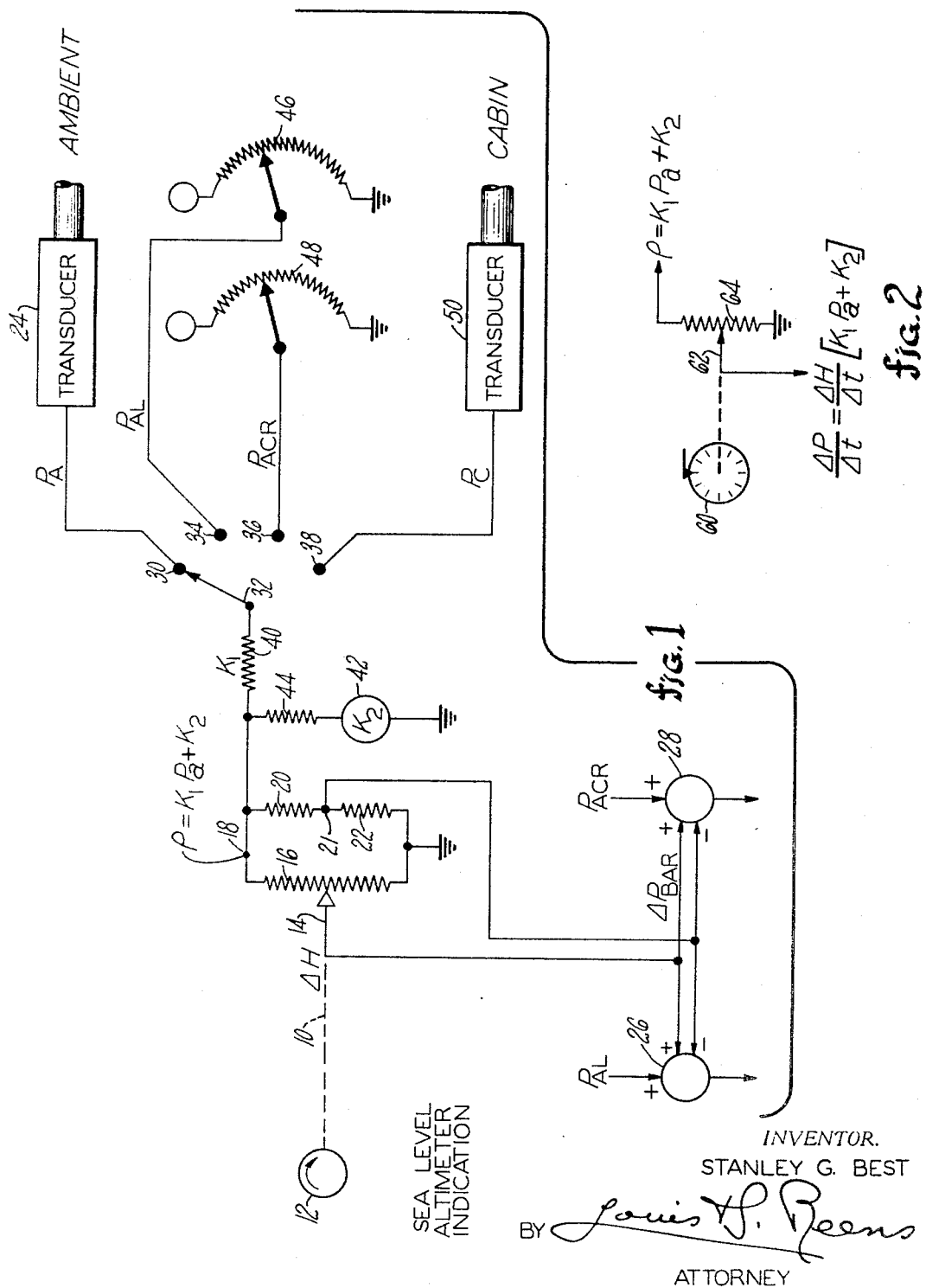

3,447,377
ALTITUDE-TO-PRESSURE TRANSFORMATION
Stanley G. Best, Manchester, Conn., assignor to United Aircraft Corporation, East Hartford, Conn., a corporation of Delaware
Filed July 11, 1966, Ser. No. 564,115
Int. Cl. G01l 7/20
U.S. Cl. 73—384        6 Claims

ABSTRACT OF THE DISCLOSURE

Any one of several different pressures may be coupled to a network fed by a standard voltage so as to form a density signal as a function of pressure; the density signal is fed to a potentiometer, the setting of which is controlled by a change in altitude scheduled under operator control; the change in altitude may either be a rate or a deviation for compensating barometric changes. The potentiometer may be used singly or in a bridge configuration which provides differential pressure changes as a function of altitude changes at a given pressure.

---

This invention relates to a device for transforming altitude signals to pressure signals. More specifically it relates to a device for barometrically correcting pressure signals representing pressures at variable altitudes.

In an aircraft, signals indicative of pressures at various flight altitudes must be corrected for barometric changes. For instance, in an aircraft cabin pressure control system pressure reference signals are used which must be barometrically corrected. In some systems the cabin pressure control reduces the cabin pressure to a predetermined level as the craft reaches the cruise altitude, and it may have to be capable of recognizing the occurrence of the cruise mode or phase. Similarly, when the aircraft descends, the cabin pressure control must raise the cabin pressure to that existing at the landing field. The occurrence of the cruise phase is sensed by comparing a signal indicative of the ambient pressure external to the cabin, $P_a$, with a preselected ambient cruise pressure signal $P_{acr}$. If $P_{acr}$ is not corrected for barometric changes, it is possible that the control will never recognize a cruise mode.

Barometric correction input data from ground control stations are provided in the form of inches of mercury at sea level ($P_{s.l.}$). Subtraction therefrom of the standard day, 29.92 inches of Hg, yields the barometric correction $\Delta P_{s.l.}$. To transform the sea level barometric correction to a correction for a high altitude, the non-linearity between altitude and pressure variation must be taken into account to compute the barometric correction at these higher altitudes.

It is therefore an object of this invention to provide a device for transforming an altitude signal to a pressure signal for any altitude.

It is a further object of this invention to provide a device for transforming automatically a signal indicative of the barometric altitude variation ($\Delta H$) to a barometric pressure variation ($\Delta P$).

It is still further an object of this invention to generate a barometric pressure signal for a given altitude as a function of a signal indicating the pressure equivalent of that altitude and a sea level barometric correction signal.

These objects and others will become readily apparent upon a review of the following description and the drawings, wherein:

FIGURE 1 shows a preferred barometric correction embodiment of this invention.

FIGURE 2 shows a rate of change control embodiment of this invention.

In the barometric correction embodiment of this invention, a pressure signal indicative of the variation of the sea level barometric pressure from that of a standard day is modified by a signal representative of the standard day density at the altitude for which the pressure correction is to be obtained.

The sea level barometric pressure variation or correction is $\Delta P_{s.l.}$ and the corresponding altitude variation is $\Delta H_{s.l.}$. The pressure and altitude are related by the formula:

$$\Delta P_{s.l.} = -\Delta H_{s.l.} \cdot \rho_{s.l.}$$

where $\rho_{s.l.}$ is the sea level density for a standard day. Hence:

$$\Delta H_{s.l.} = \frac{-\Delta P_{s.l.}}{\rho_{s.l.}}$$

Expression of barometric variations is conventionally in units indicating altitude variations rather than pressure since an altitude variation is the same whether at sea level or 20,000 feet. Hence, $$\Delta H = \frac{-\Delta P_{s.l.}}{\rho_{s.l.}}$$

For small variations in pressure at sea level from that of a standard day, P at any pressure can be asumed to be P for that pressure on a standard day, and therefore:

$$\Delta P = \Delta P_{s.l.} \cdot \frac{\rho}{\rho_{s.l.}}$$

where $\Delta P$ represents the pressure variations at any pressure altitude and $\rho$ the corresponding density at that altitude. Substituting yields $$\Delta P = -\Delta H \rho$$

It was discovered that standard day density varies linearly with ambient pressure as the altitude is changed within acceptable accuracy limits. This holds true up to altitudes in excess of 15,000 feet. One may therefore write $$\rho = K_1 P_a + K_2$$

where $P_a$ represents the ambient pressure indication at the selected altitude for which a barometric correction is to be made. Hence, $$\Delta P_{bar} = \Delta H (K_1 P_a + K_2) \text{ p.s.i.}$$

where $K_1 = -3.17 \times 10^{-5/\text{ft.}}$ and $K_2 = -7.2 \times 10^{-5}$ p.s.i./ft.
$P_a$ = pressure, in p.s.i.
$\Delta H$ = altitude variation in ft.

FIGURE 1 shows an implementation of the last equation. The pilot receives (audibly, by radio, for instance) from a ground station an absolute sea level pressure in inches of mercury. He rotates a scale 12 to indicate this.

The scale 12 is attached to a shaft 10 which is coupled to the wiper 14 of a potentiometer or variable resistor 16. The resistor 16 is connected at one end to ground and is excited by a voltage representing the equation $$\rho = K_1 P_a + K_2$$

The wiper 14 is electrically coupled through two summing networks 26 and 28 to which also are added preselected ambient pressure signals (e.g., set by an operator) respectively indicating the ambient pressure anticipated at the landing field $P_{al}$ and at the ambient cruise pressure $P_{acr}$ for standard day conditions. The resistor 16 is part of a bridge network comprising, in addition, resistors 20 and 22 joined at a common point 21. The signal derived from the wiper 14 is thereby capable of providing both a positive and a negative correction signal relative to the junction of 20 and 22 depending upon whether the barometric correction is for a high or a low pressure day.

The excitation voltage for the variable resistor 16 is derived in the figure from the pressure transducer 24 which produces an electrical output voltage indicative of the ambient pressure, $P_a$. The signal is applied to terminal 30 of switch 32 and coupled therethrough to resistor 40. The other side of resistor 40 is connected to the junction 18 together with a voltage from a bias voltage 42 which is coupled to junction 18 through resistor 44.

The effect of resistor 40 and the bias 42 is to provide at junction 18 a voltage indicative of the density according to the formula as shown above. Since the variable resistor 16 is excited by this voltage and the shaft rotation indicating $\Delta H$ is directly coupled to the wiper 14, the output between the wiper 14 and common point 21 represents the multiplication of $\Delta H(K_1 P_a + K_2)$, which equals $\Delta P_{bar}$.

The common point 21 between resistors 20 and 22 is coupled to the negative input of summing networks 26 and 28 so that the correction signal, $\Delta P_{bar}$, is represented by the difference applied to the networks, 26, 28.

The correction obtained is accurate to within several percent up to altitudes of 18,000 feet. This altitude is within the range of importance since aircraft are normally flown using standard day conditions ($\Delta P_{bar}=0$) above this altitude.

It should be noted that the $P_a$ signal need not be the sole source of excitation for the variable resistor 16. Other pressure signals may be used. The requirement is that the excitation signal must represent the pressure at the altitude for which the barometric correction must be made.

Hence, the switch 32 may be coupled to terminal 34 whereon is present a signal ($P_{al}$), indicating the standard day pressure at a field where the next landing is to be made, obtained from the wiper terminal on an operator-controlled variable resistor 46. Also, on terminal 36 is provided a signal ($P_{acr}$) indicating desired ambient cruise pressure from the wiper of an operator-controlled variable resistor 48. On terminal 38, the cabin pressure signal is provided from a transducer 50. Other excitation pressure signals may be added where the pressure signals represent selected (rather than actual) cabin pressures or barometrically corrected $P_{al}$ or $P_{acr}$ signals, if desired in a given usage of the present invention.

The advantage of using $P_a$ for excitation of the variable resistor 16 is that it will represent the pressure both at the cruising altitude and the landing altitudes for which barometric corrections are to be made. In the event the switch 32 is coupled to terminal 34 then the device will only correct for the landing field altitude. Where the switch 32 is coupled to the terminal 38, the cabin pressure can be used as excitation for the landing termination of the flight since the cabin must represent this pressure at that time.

A further use of this invention may be explained in relation to FIGURE 2. FIGURE 2 shows a rate limiter device including a dial 60 which is mechanically coupled to the wiper 62 of a potentiometer 64. The potentiometer 64 is excited by a signal indicative of the standard day density at varying altitude pressures. The dial 60 is provided with calibrations in feet per minute, $\Delta H/\Delta t$. By rotating the dial to indicate the desired rate of change in feet per minute, a corresponding rate of change signal in p.s.i. per minute for different altitudes may be obtained from the wiper 62. The rate of change signal may then be used to control the cabin pressure and hold its change within the desired rate, for instance. In other words, given that there is a device which provides a signal indicating an altitude variation as a function of time, the altitude variation being that at sea level, the present invention can convert that variation to one at the given altitude. Thus the invention can convert an altitude variation ($\Delta H$) to a pressure variation ($\Delta P$), whether the $\Delta H$ is due to barometric variations or due to a rate of change with time.

It is to be understood that the invention is not limited to the specific embodiment herein illustrated and described but may be used in other ways without departure from its spirit.

I claim:
1. Apparatus for transforming an altitude change signal to a corresponding pressure change signal at varying pressures, comprising:
   means for generating a pressure signal indicative of a pressure for which a corresponding pressure change signal is to be generated;
   means responsive to said pressure signal for producing a density signal indicative of the standard day air density at the pressure indicated by said pressure signal;
   means for scheduling an altitude change; and
   means coupled to receive said density signal and controlled by said scheduling means for producing a signal indicative of a pressure change, said signal resulting from the product between said density signal and the scheduled altitude change.
2. Apparatus according to claim 1 wherein said density signal producing means comprises:
   means for producing the product of said pressure signal and a factor which is substantially proportional to the slope of the curve formed between ambient pressure and air density at standard day conditions;
   means for adding to the product of said last-named means a factor representing the density intercept of a plot of air density as a function of ambient pressure at standard day conditions.
3. Apparatus according to claim 1 wherein said scheduling means comprises: a potentiometer having an adjustable wiper, one end of said potentiometer being coupled to said density signal means so that said potentiometer is excited by said density signal.
4. A device according to claim 3 wherein said pressure change signal generation means comprises: a bridge network including said potentiometer as a first pair of legs of said bridge and a pair of fixed resistors as a second pair of legs of said bridge, both of said pairs of legs of said bridge being excited by said density signal, the elements of said bridge being adjusted to provide a pressure change signal having a null output for no change, and a variable polarity depending upon the sense of pressure change resulting from the altitude change scheduled by said scheduling means.
5. Apparatus according to claim 1 wherein said altitude change signal comprises a barometric altitude correction.
6. A device according to claim 1 wherein said altitude change signal comprises a scheduled rate of change of altitude with respect to time periods.

References Cited
UNITED STATES PATENTS

| | | | |
|---|---|---|---|
| 2,731,831 | 1/1956 | Schaefer | 73—387 |
| 2,825,227 | 3/1958 | Sandberg | 73—386 |
| 3,264,876 | 8/1966 | Ten Bosch et al. | 73—386 |

LOUIS R. PRINCE, *Primary Examiner.*

DONALD O. WOODIEL, *Assistant Examiner.*

U.S. Cl. X.R.

73—179